(12) United States Patent
Zhou et al.

(10) Patent No.: US 10,136,134 B2
(45) Date of Patent: Nov. 20, 2018

(54) METHOD TO ENCODE VIDEO WITH CLOSE MULTIPLE SCENE CHANGES

(71) Applicant: ARRIS Enterprises, Inc., Suwanee, GA (US)

(72) Inventors: Wei Zhou, Milpitas, CA (US); Swaroop Chanda, Santa Clara, CA (US); Wayne D. Michelsen, Santa Clara, CA (US); Jane Perera, Saratoga, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 239 days.

(21) Appl. No.: 14/967,991

(22) Filed: Dec. 14, 2015

(65) Prior Publication Data

US 2017/0171545 A1    Jun. 15, 2017

(51) Int. Cl.
*H04N 7/12*       (2006.01)
*H04N 19/124*   (2014.01)
(Continued)

(52) U.S. Cl.
CPC ......... *H04N 19/124* (2014.11); *H04N 19/107* (2014.11); *H04N 19/14* (2014.11);
(Continued)

(58) Field of Classification Search
CPC .......................... H04N 19/129; H04N 19/142
(Continued)

(56) References Cited

U.S. PATENT DOCUMENTS

| 6,023,520 A | 2/2000 | Nagasaka et al. |
| 2007/0074266 A1* | 3/2007 | Raveendran ........... H04N 5/144 725/135 |

(Continued)

FOREIGN PATENT DOCUMENTS

| WO | 00/19726 A1 | 4/2000 |
| WO | 01/50339 A2 | 7/2001 |

OTHER PUBLICATIONS

Combined Search and Examination Report, RE: Great Britain Application No. GB1522193.0, dated Jan. 29, 2016.
(Continued)

*Primary Examiner* — Richard T Torrente
(74) *Attorney, Agent, or Firm* — Thomas A. Ward

(57) ABSTRACT

A video encoding method is provided when three scenes are separated by two closely spaced scene changes. For scene changes spaced greater than a threshold, scene changes are programmed with I frames in a normal fashion. If less than the threshold, the method encodes depending on complexity of the first, second and third scene to determine how to encode the scene changes. To compare complexities, the process begins by using $X_1$, $X_2$, and $X_3$ to note respectively the complexities of the first, the second and the third scenes. If the absolute difference of $X_1$ and $X_2$ is higher than a first threshold and the absolute difference of $X_2$ and $X_3$ is higher than a second threshold, the first scene change is more significant than the second scene change, so in that case the process encodes the first scene change as an I-frame and picks a quantization parameter (QP) based on the complexity blended from the complexity of scene 2 ($X_2$) and scene 3 ($X_3$).

8 Claims, 7 Drawing Sheets

Two-Path Encoder

(51) Int. Cl.
*H04N 19/142* (2014.01)
*H04N 19/179* (2014.01)
*H04N 19/107* (2014.01)
*H04N 19/14* (2014.01)
*H04N 19/87* (2014.01)
*H04N 19/159* (2014.01)
*H04N 19/172* (2014.01)

(52) U.S. Cl.
CPC ......... *H04N 19/142* (2014.11); *H04N 19/159* (2014.11); *H04N 19/172* (2014.11); *H04N 19/179* (2014.11); *H04N 19/87* (2014.11)

(58) Field of Classification Search
USPC .................................................... 348/240.03
See application file for complete search history.

(56) References Cited

U.S. PATENT DOCUMENTS

| | | | |
|---|---|---|---|
| 2009/0086816 A1 | 4/2009 | Leontaris et al. | |
| 2016/0037170 A1* | 2/2016 | Zhang ................. | H04N 19/142 375/240.12 |

OTHER PUBLICATIONS

PCT Search Report & Written Opinion, Re: Application No. PCT/US2015/065568, dated May 19, 2016.

\* cited by examiner

METHOD TO ENCODE VIDEO WITH CLOSE MULTIPLE SCENE CHANGES

BACKGROUND

Technical Field

The present invention relates to detection of a scene change in a video to enable more efficient encoding. More particularly, the invention relates to resetting a starting quantization parameter (QP) for the new scene based on the new scene complexity.

Related Art

Video commonly transitions from one scene to a different scene. The transition can take place between two consecutive video frames or multiple video frames. Normally, the transition between two frames is referred to as a scene cut and the one across multiple frames is referred as fade or dissolve.

In order to achieve good video quality, encoding scene changes properly is important. The first picture of a new scene needs to be encoded as an Intra-picture, because it cannot be efficiently inter predicted by using any frames in the previous scene as a reference frame. The first picture being encoded as an Intra-picture establishes a high-quality reference for the subsequent inter-prediction pictures in the new scene. However, regarding buffer management and rate-control, I-pictures are expensive, and encoding them at a particular location must be carefully considered to avoid excessive bit allocation by the encoder.

Additionally for a new scene, rate control models usually need to reset the starting quantization parameter (QP) based on the scene complexity. The scene complexity can be provided by a lookahead encoder in a two-pass encoding system. One way of calculating the complexity is to use multiplication of the number of encoding bits and the linear QP. The complexity can also be estimated by the spatial activity and temporal activity. The higher the complexity is, the more difficult the video is to be encoded. Generally, QP is positively related to the complexity of the video for a given bitrate. Lower QP is used for scenes with lower complexity and higher QP is used for scenes with higher complexity. Within a scene, fluctuations of QPs are small as the complexity tends to stay at the same level. When a scene change occurs, the complexity could change significantly. Therefore, encoding a scene change (SC) I-frame also requires that the rate control adjust the starting QP for the new scene.

FIG. 1 shows the complexity curve of a video transiting from a low complexity scene to a high complexity scene. The frames 1, 2, and 3 are in the low complexity scene, so they are encoded using low QPs. The frame 4 is a scene cut frame. If a similar low QP used in the old scene is used for the new scene, the scene change frame 4 would show bad quality during encoding. Therefore, the rate control needs to pick a high QP for the new scene, including during the scene change frame 4.

Error! Reference source not found. FIG. 2 shows the complexity curve of a video transiting from a high complexity scene to a low complexity scene. The frames 1 to 12 are in the high complexity scene, so they are encoded using high QPs. The frame 12 is a scene cut frame. If a similar high QP used in the old scene is used for the new scene, the scene change frame would consume a lot of unnecessary bits during encoding. Therefore, the rate control needs to pick a low QP for the new scene, including during the scene change frame 12.

The above two cases are straight forward to solve, but the following cases are not.

In FIG. 3, a first scene change is closely followed by another second scene change. The frame 4 is the first scene change frame and the frame 12 is the second one. In this example, the scene changes are 8 frames apart. Frames 1 to 3, noted as scene 1, have high complexity. Frames 4 to 11, noted as scene 2, have low complexity. Frames 12 to 16, noted as the scene 3, have medium complexity.

In one prior art encoding method, both scene changes are encoded as I frames. Low QP is selected for the scene 2 and medium QP is selected for the scene 3. The scene 2 has the lowest complexity among the three. Due to its short duration, it is not wise to spend too many bits on this scene because the Video Quality (VQ) improvement is for a short duration and not visually noticeable. Moreover, if scene 2 consumed too many bits, there could be fewer bits for the scene 3 to consume, which may lead to bad video quality in scene 3.

In another prior art method, the first scene change is ignored and the second scene is encoded as a part of scene 1. Only the second scene change at frame 12 is encoded with an I-frame having a medium QP. The purpose of this approach is to save some bits over the scene 2, but this creates a problem. The scene 1 uses a high QP. If scene 2 is encoded as a part of scene 1, it continues to use a high QP and too few bits are allocated during scene 2. This could create bad Video Quality (VQ) that is very noticeable even if scene 2 is very short.

FIG. 4 shows another example of the two close scene change case. The first scene is a low complexity scene, the second scene is short with high complexity and the third one has medium complexity. If the first scene change is ignored and encoded as part of the first scene, low QP of the scene 1 would be used for the scene 2. It would cause too many bits are used for scene 2, which may cause an encoder buffer overflow, and or compromise the ability of rate control when apportioning bits to scene 3

It is desired to provide better methods of encoding multiple successive scene changes with different QP levels without over or under allocating bits for encoding during some scenes.

SUMMARY

Embodiments of the present invention provide an improved encoding method to overcome these described prior art problems and encode two close scene changes with a good balance of video quality and bandwidth consumption. The basic idea is to determine the frame to encode as an I frame based on analysis of their complexities, instead of encoding blindly both scene changes as I frames or always waiting and encoding only at the latter scene change.

This improved method of encoding in one embodiment includes two different ways of encoding I frames depending on the separation between scene changes. In a first way, when the two scene changes dividing three scenes are far enough apart or beyond a first predetermined threshold, the scene changes are considered normal scene cuts and are programmed in a conventional manner using a Scene Change (SC) I frame. For the second way, when the scene change distance is less than the first threshold, the encoding proceeds by analyzing and comparing complexities.

For the second way, the method proceeds by comparing the complexities of the first, second and third scene to determine how to encode the scene changes. To compare complexities, the process begins by using $X_1$, $X_2$, and $X_3$ to note respectively the complexity values of the first, the second and the third scenes.

If $X_2$ is either far greater or smaller than $X_1$ and $X_3$ is close to $X_2$, the first scene change is more significant than the second scene change. Mathematically, this comparison can be described by checking if the absolute difference of $X_1$ and $X_2$ is greater than a complexity threshold $X_{th1}$ and the absolute difference of $X_2$ and $X_3$ is less than a complexity threshold $X_{th2}$. In this case the process encodes the first scene change as a SC I frame and picks a QP based on the complexity blended from the complexity of scene 2 ($X_2$) and scene 3 ($X_3$). The third scene, after the second scene change, is then encoded with its proper QP. Although there is no SC I frame for the second scene change, an equivalent P frame with mostly intra macroblocks can be encoded for the second scene change.

If $X_2$ is far greater than $X_1$ and $X_3$ is close to $X_1$, both of the scene changes are significant. Mathematically, this comparison can be described by checking if the absolute difference of $X_1$ and $X_2$ is greater than a complexity threshold $X_{th1}$ and the absolute difference of $X_2$ and $X_3$ is also greater than a complexity threshold $X_{th1}$. In this case, the process encodes both the scene changes as SC I frames. In addition, a high QP is selected for the first scene change to ensure there is no buffer overflow. Because the scene 2 is short and already very complicated, using a high QP will not worsen much the perceptual VQ. The selection of the QP for the second scene change is based on the complexity of the scene 3 ($X_3$) in the conventional way.

If $X_2$ is close to $X_1$ and $X_3$, none of the scene changes is significant. Mathematically, this comparison can be described by checking if the absolute difference of $X_1$ and $X_2$ is less than a complexity threshold $X_{th2}$ and the absolute difference of $X_2$ and $X_3$ is also less than a complexity threshold $X_{th2}$. In this case, encoding the first scene QP does not pose a problem to be left the same because the QPs of the first scene does not hurt the video quality of the second scene. Thus, the first scene change is ignored and the second scene change is encoded with an SC I frame with the QP based on the complexity of the third scene.

BRIEF DESCRIPTION OF THE DRAWINGS

Further details of the present invention are explained with the help of the attached drawings in which.

DETAILED DESCRIPTION

Figure 5:
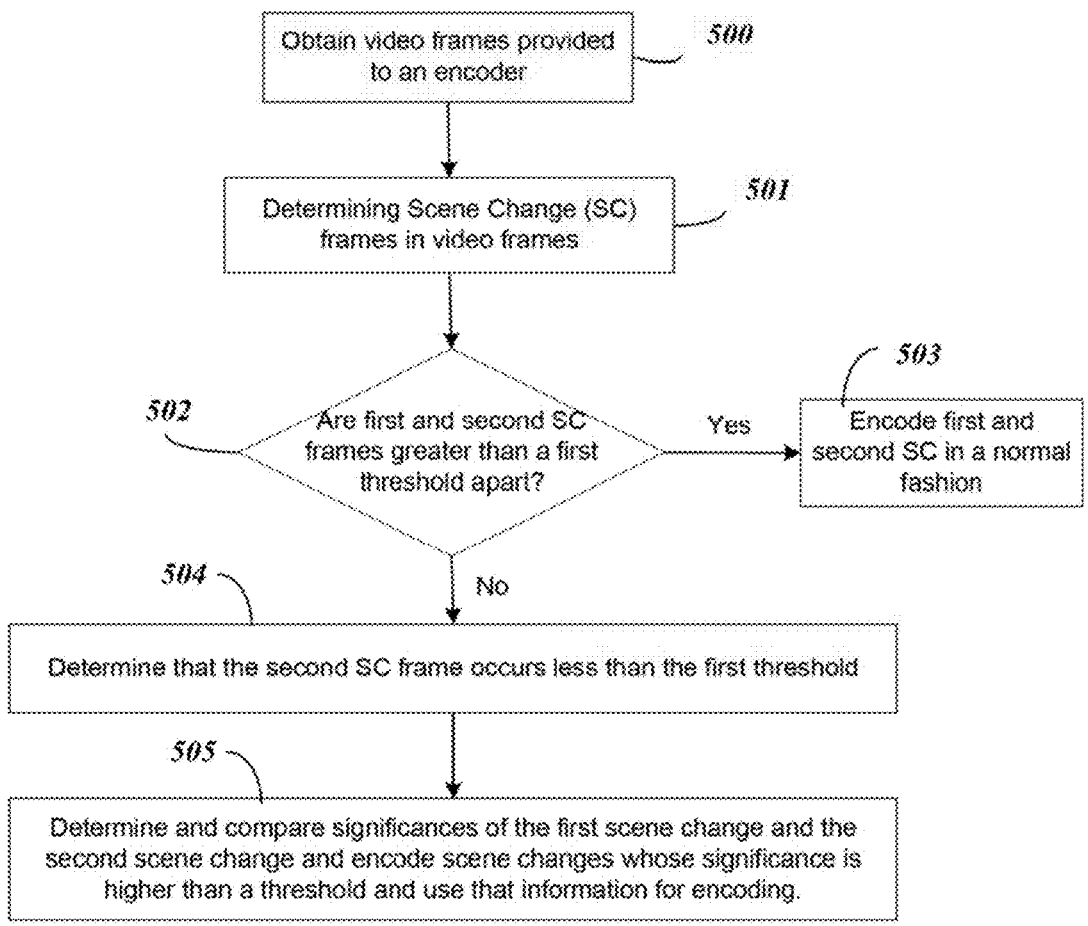
FIG. 5 provides a flow chart illustrating broadly the method of encoding with close scene changes according to the present invention.

FIG. 5 provides a flow chart illustrating broadly the method of encoding with close scene changes according to the present invention. Referring first to FIG. 5, initially in step 500, the method obtains video frames provided to an encoder for encoding. In step 501, the method next identifies the scene changes in the video frame. In step 502, a determination is made if a first and second close scene change are greater than a threshold apart. This decision is made in step 502, with the threshold set long enough to identify scene changes that are not close enough to apply embodiments of the present invention. If the decision in step 502 is that the scene changes are too far apart, in step 503 the first scene change is encoded with an I-frame, as is normally done during encoding. If the scene changes are determined in step 502 to not be over the threshold, operation proceeds in step 504 with the determination that further steps according to the present invention will be applied. In particular, in step 505 the significances of the first and second scene changes are determined and compared and scene changes whose significance is higher than a threshold are determined and that significance information is used for encoding.

Figure 6:
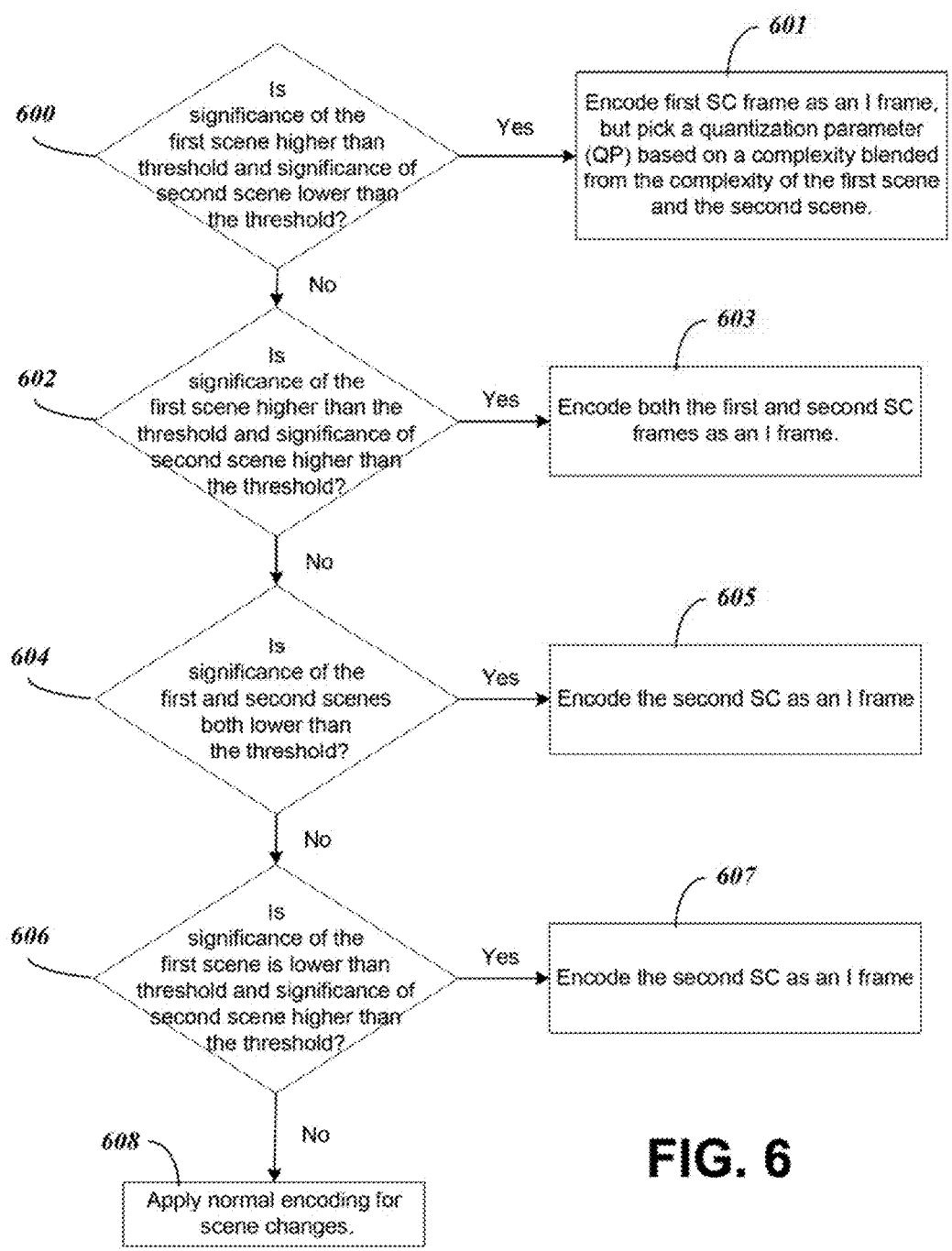
FIG. 6 provides a flow chart illustrating specifics for the last step in FIG. 5 for comparing the significance of scene changes.

FIG. 6 provides a flow chart illustrating specifics for the last step in FIG. 5 of determining and comparing the significance of scene changes and using that information for encoding. First in step 600, a preferred step according to embodiments of the present invention is applied to provided a blended complexity for encoding in certain circumstances. In particular, in step 600 the determination is made if the significance of the first scene is higher than a threshold and the significance of the second scene is lower than the threshold. If the determination in step 600 is true, in step 601 the first scene change frame is encoded as an I-frame, but the quantization parameter (QP) is picked based on a complexity blended from the complexity of the first scene and the second scene. If the determination in step 600 is negative, operation proceeds to subsequent steps where blended complexities are not applied.

Subsequent determinations are made in steps 602, 604 and 606 where complexities between the scenes are not blended. In particular, in step 602 a determination is made if the significance of the first scene is higher than the threshold and further that the significance of the second scene is lower than the threshold. If the determination in step 602 is true, both the first and second scene changes are programmed with an I-frame in step 603. Further, a high QP is used to encode the first scene change. If the determination in step 602 is false, operation proceeds to step 604 where a determination is made if the significance of both the first and second scenes are lower than the threshold. If the determination instep 604 is true, the second scene change is programmed with an I-frame in step 605. If the determination in step 602 is false, operation proceeds to step 606 where a determination is made if the significance of the first scene is lower than the threshold and if the significance of the second scene is higher than the threshold. If the determination in step 606 is true, the second scene change is programmed with an I-frame in step 607. If the determination in step 606 is false, operation proceeds with normal encoding techniques in the encoder in step 608.

Figure 7A:
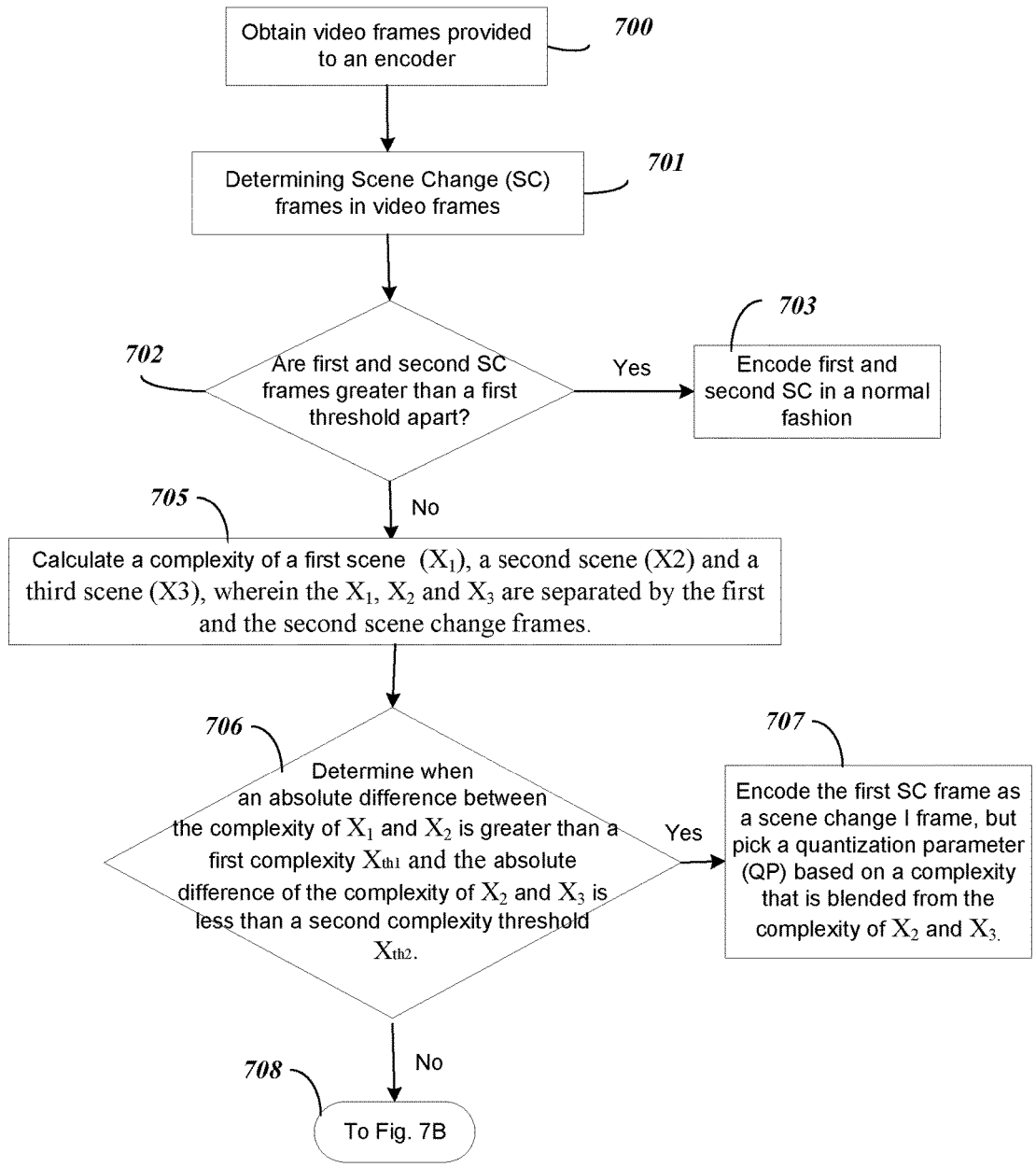
FIG. 7A-7B provide a flow chart illustrating more specific steps of encoding with close scene changes according to the present invention.
Figure 7B:
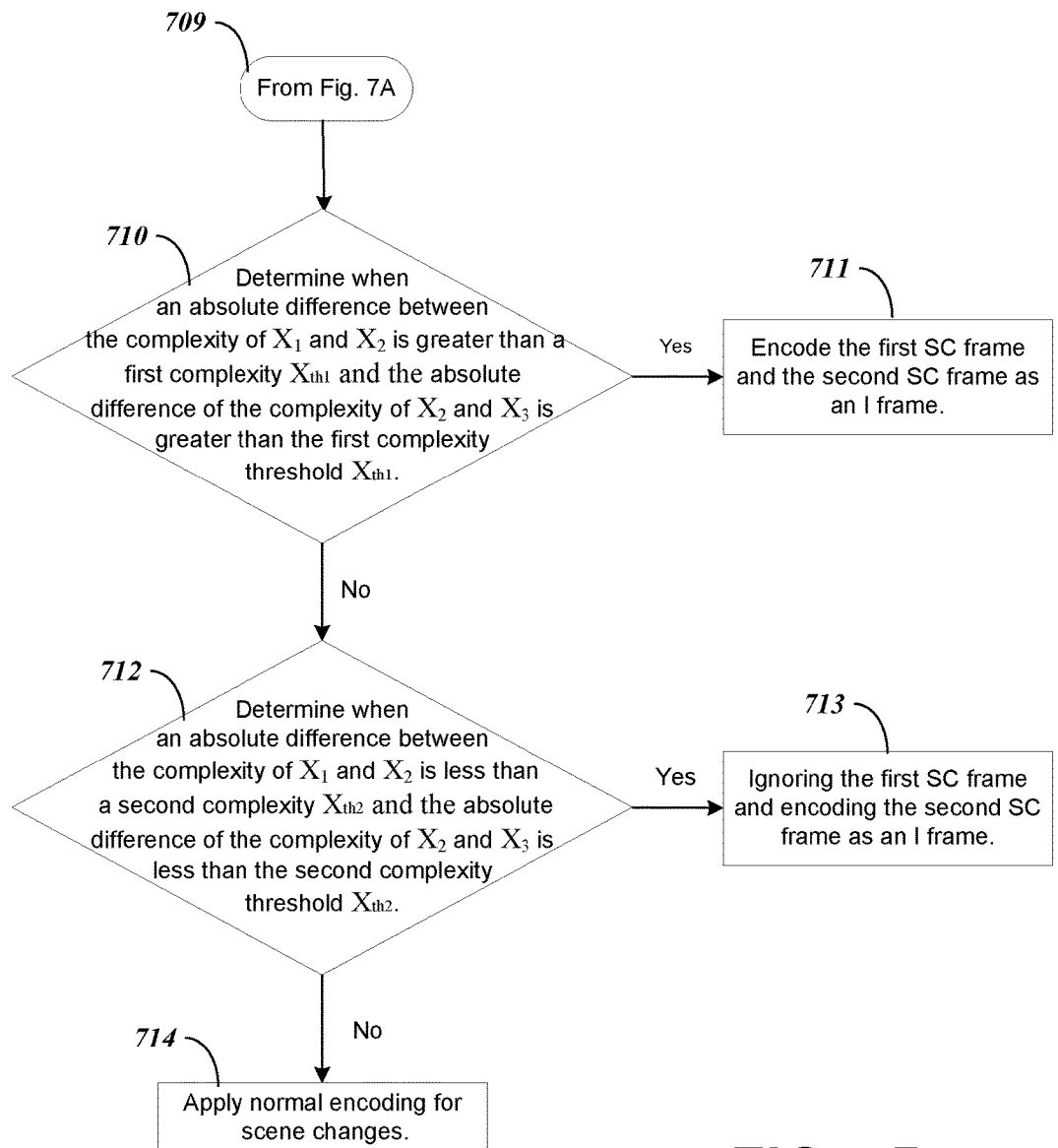

FIGS. 7A-7B provide a flow chart illustrating more specific steps of encoding with close scene changes according to the present invention. Similar to the flow chart of FIG. 5, in FIGS. 7A-7B, the method begins with the steps including 700 of receiving the video frames for encoding, and step 701 for identifying the scene change frames.

Further as with the system of FIG. 5, the method of FIGS. 7A-7B provides two different ways of encoding I frames depending on the separation between scene changes. In a first way, in step 702 after a determination that two scene changes dividing three scenes are far enough apart or beyond a first predetermined threshold, the scene changes are considered normal scene cuts and in step 703 are programmed in a conventional manner using the normal scene change I-frame in the encoder. For the second way, when the scene change distance is less than the first threshold as determined in step 702, the encoding proceeds by analyzing and comparing complexities in subsequent steps.

For this second way in the flow of FIGS. 7A-7B, the method proceeds in steps by comparing the complexities of the first, second and third scene to determine how to encode the scene changes. To compare complexities, the process begins by using $X_1$, $X_2$, and $X_3$ to note respectively the complexity values of the first, the second and the third scenes. Thus, the second scenario begins in step 705 with a calculation of a complexity of a first scene ($X_1$), a second scene ($X_2$) and a third scene ($X_3$), wherein $X_1$, $X_2$ and $X_3$ are separated by the first and the second scene change frames.

A first determination is made for this second way beginning in step 706. If $X_2$ is either far greater or smaller than $X_1$ and $X_3$ is close to $X_2$ the first scene change is more significant than the second scene change, and this determination is made using step 706. Such a determination in step 706 is made when an absolute difference between the complexity of $X_1$ and $X_2$ is greater than a first complexity threshold $X_{th1}$ and an absolute difference of the complexity of $X_2$ and $X_3$ is less than a second complexity threshold $X_{th2}$. If this determination is positive in step 706, in step 707 the first scene change is encoded as a scene change I-frame, but the quantization parameter (QP) is picked based on a complexity that is blended from the complexity of $X_2$ and $X_3$. This blended QP parameter is unique in embodiments of the present invention.

The benefit of applying step 706 is that the second scene is not encoded by inheriting the QPs of the first scene, but QPs are determined by the blended complexity that is much closer to its own complexity. Because the second scene and third scene are considered the same scene basically when the step 706 is applied, the third scene is also encoded with a proper QP. Although there is no SC I frame for the second scene change, an equivalent P frame with mostly intra macroblocks would be encoded, which gives good quality for the third scene.

Figure 1:
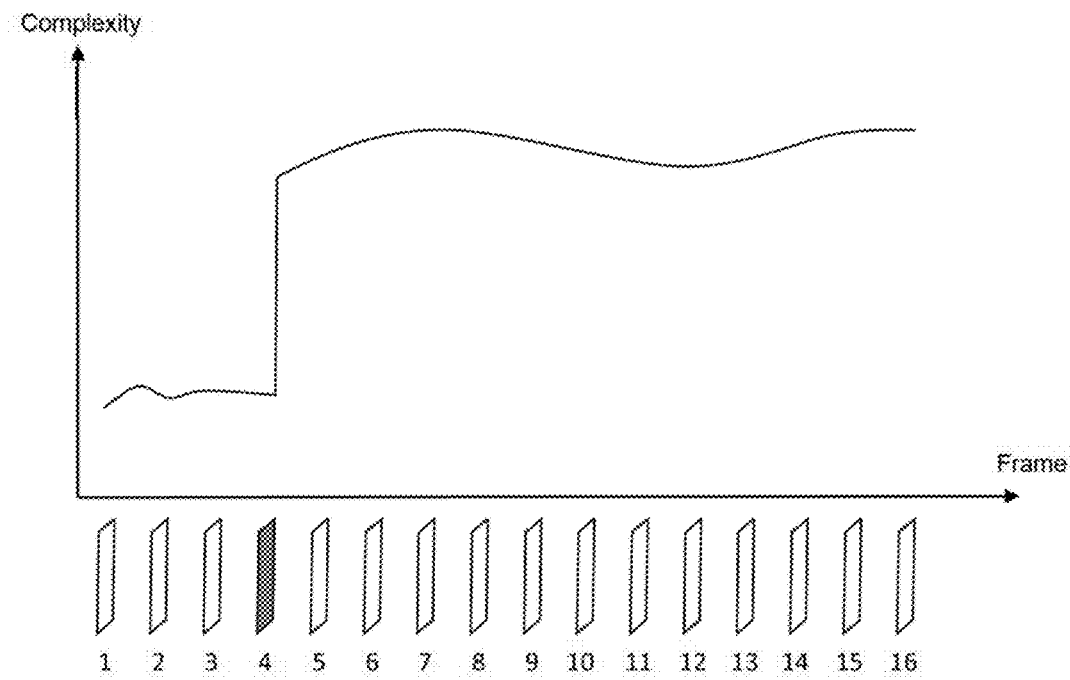
FIG. 1 shows the complexity curve of a video transiting from a low complexity scene to a high complexity scene.
Figure 2:
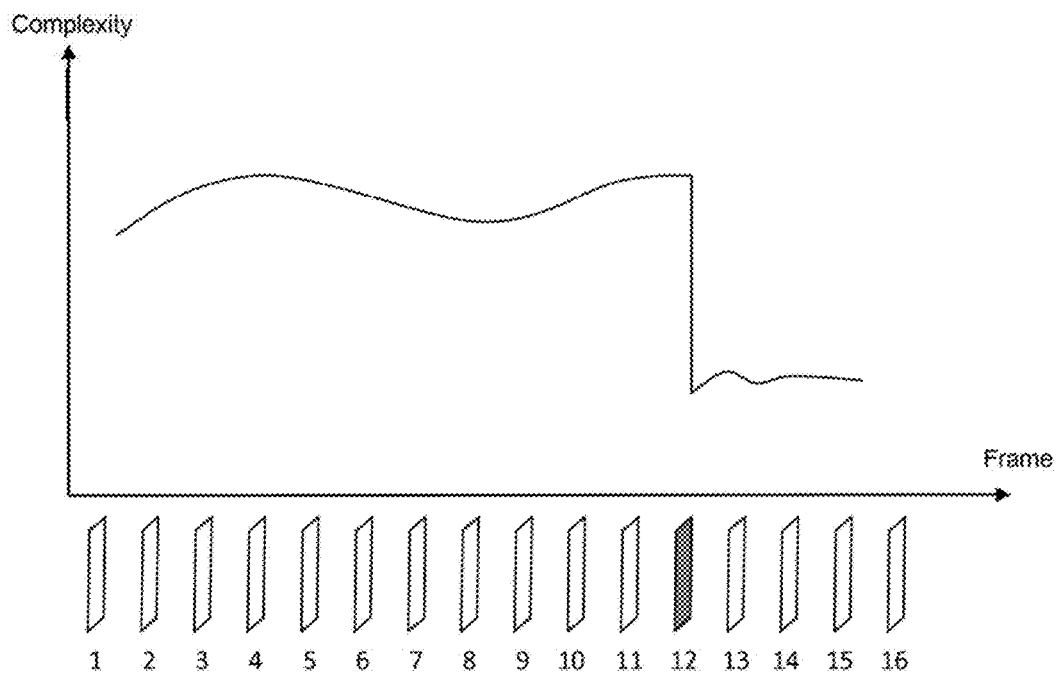
FIG. 2 shows the complexity curve of a video transiting from a high complexity scene to a low complexity scene.
Figure 3:
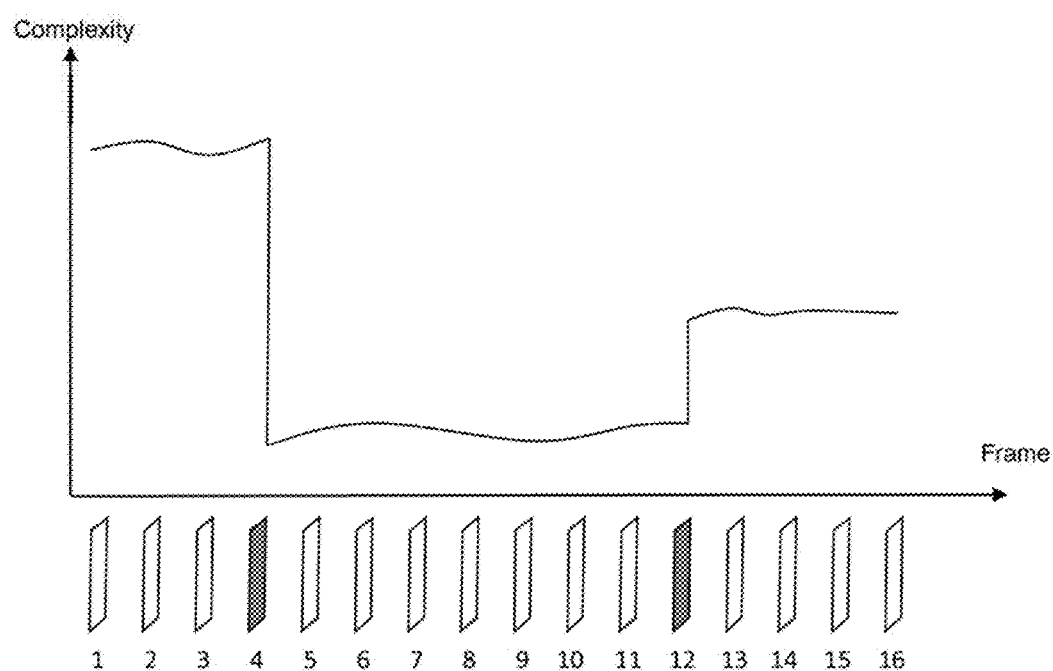
FIG. 3 illustrates a first scene change closely followed by another second scene change.
Figure 4:
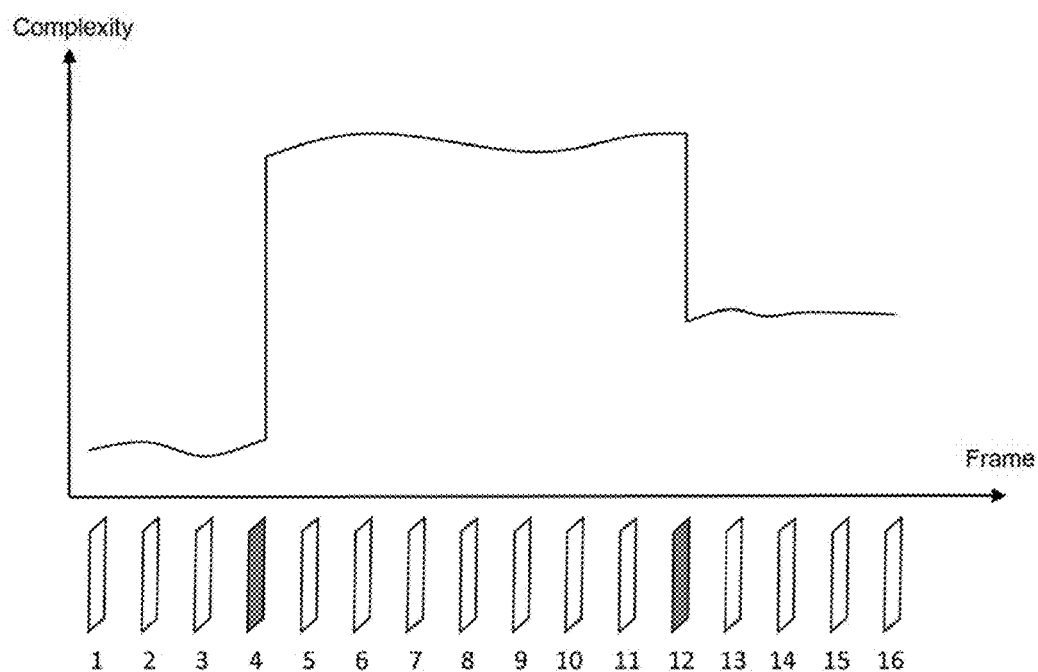
FIG. 4 shows another example of two close scene changes.

If the determination in step 706 is negative, operation proceeds from FIG. 1A to FIG. 1B in steps 708-709, and a subsequent determination 710 is applied. If $X_2$ is far greater than $X_1$ and $X_3$ is close to $X_1$, both scene changes are significant, and a determination of these circumstances is made in step 710. Mathematically, the determination of step 710 is made by checking if the absolute difference of $X_1$ and $X_2$ is greater than a complexity threshold $X_{th1}$ and the absolute difference of $X_2$ and $X_3$ is also greater than a complexity threshold $X_{th1}$. If the determination in step 710 is positive, in step 711 both the scene changes are programmed as scene change I-frames. In addition, a high QP is selected for the first scene change to ensure there is no buffer overflow. Because the scene 2 is short and already very complicated, using a high QP will not worsen much the perceptual visual quality. The selection of the QP for the second scene change is based on the complexity of the scene 3 ($X_3$) in the conventional way.

If the determination at step 710 is negative, operation proceeds to step 712 for a subsequent determination. If $X_2$ is close to $X_1$ and $X_3$, none of the scene changes is significant, and a determination of this circumstance is made in step 712. Mathematically, the determination of step 712 is made by checking if the absolute difference of $X_1$ and $X_2$ is less than a complexity threshold $X_{th2}$ and the absolute difference of $X_2$ and $X_3$ is also less than a complexity threshold $X_{th2}$. In this case, encoding the first scene QP does not pose a problem to be left the same because the QP of the first scene does not hurt the video quality of the second scene. Thus, if the determination in step 712 is positive, operation proceeds to step 713 where the first scene change is ignored and the second scene change is encoded with an SC I-frame with the QP based on the complexity of the third scene. If the determination in step 712 is false, operation proceeds with normal encoding techniques in the encoder in step 714.

Figure 8:
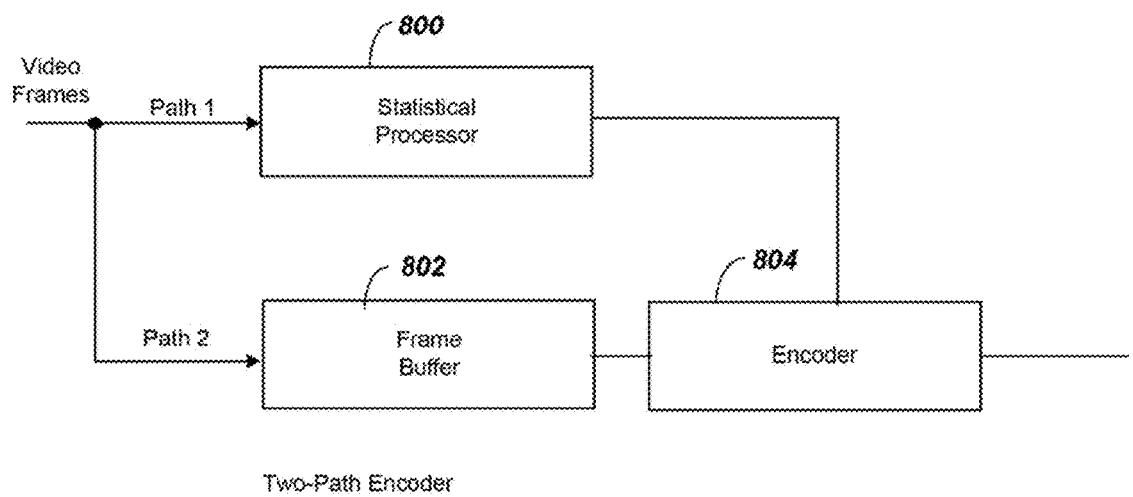
FIG. 8 shows components for a two-pass encoder to enable encoding with close scene changes according to embodiments of the present invention.

FIG. 8 is a diagram of components for implementing embodiments of the present invention. In FIG. 8, the statistical processor 800 receives video frames for encoding and computes the statistical information for scene changes based on scene spacing, such as how to encode I-frames for the scene changes, as described previously herein. The encoding in encoder 804 will be delayed by the frame buffer 802 until the statistical scores are determined in statistical processor 800. The encoder 804 then uses the results from the statistical processor 800 to encode the video frames according to the methods of embodiments of the present invention.

The components shown in FIG. 8 form part of a two-path encoder. The statistical processor 800 is provided in a first path of the two path system. The first path receives the video frames and provides statistical information to enable more efficient processing in the second path. The encoder 804 is provided in the second path and receives the video frames and uses the statistical information to encode the video frames. Although the embodiments of the invention can be provided with a single path encoder, use of a two path encoder enables faster efficient statistical information to be provided for the encoding process.

For components shown, like the statistical processor 800 and the encoder 804, each component according to embodiments of the present invention can include a processor and memory to enable operation. The memory of each device stores code that is executable by the processor to enable the processor to perform the processes described herein. Further the memory can be used to provide data storage with the data accessible by the processor to store or retrieve when performing operations.

Although the present invention has been described above with particularity, this was merely to teach one of ordinary skill in the art how to make and use the invention. Many additional modifications will fall within the scope of the invention as that scope is defined by the following claims.

What is claimed:
1. A method for encoding video having at least two close successive scene changes comprising:
    obtaining video frames provided to an encoder;
    determining scene change frames in the video frames;
    determining when a first scene change frame and a second scene change frame occur greater than a first threshold number of frames apart, and when so providing information for the encoder to encoding the first and second scene changes in a normal fashion;

determining that the first scene change frame and the second scene change frame occur less than the first threshold number of frames, and when so performing the following steps:

determining a complexity of a first scene ($X_1$), a second scene ($X_2$) and a third scene ($X_3$), wherein the $X_1$, $X_2$ and $X_3$ are separated by the first and the second scene change frames;

determining when an absolute difference between the complexity of $X_1$ and $X_2$ is greater than a first complexity threshold Xth1 and the absolute difference of the complexity of $X_2$ and $X_3$ is less than a second complexity threshold Xth2, and when so encoding the first scene change frame as a scene change I frame, but picking a quantization parameter (QP) based on a complexity that is blended from the complexity of $X_2$ and $X_3$.

2. The method of claim 1, wherein the third scene after the second scene change is then encoded with its proper QP when the blended complexity is used.

3. The method of claim 1, wherein an equivalent P frame with mostly intra blocks is encoded for the second change when the blended complexity is used.

4. The method of claim 1, further comprising:

determining when an absolute difference between the complexity of $X_1$ and $X_2$ is greater than the first complexity threshold Xth1 and the absolute difference of the complexity of $X_2$ and $X_3$ is greater than the second complexity threshold Xth1, and when so encoding the first scene change frame and the second scene change frame as a scene change I frame.

5. The method of claim 4, further comprising:

determining when an absolute difference between the complexity of $X_1$ and $X_2$ is less than the second complexity threshold Xth2 and the absolute difference of the complexity of $X_2$ and $X_3$ is less than the second complexity threshold Xth2, and when so ignoring the first scene change frame and encoding the second scene change frame as a scene change I frame.

6. An apparatus to encode video frames, the apparatus comprising:

an encoder having a first input for receiving video frames to be processed and a second input for receiving parameter data to enable the encoder to allocate bits for frames for encoding;

a statistical analysis processor that receives the video frames and has an output providing the second input to the encoder;

a processor memory connected to the statistical analysis processor for storing code that is executable by the processor to determine the parameter data to enable the encoder to allocate bits, the code causing the processor to perform the following steps:

determine scene change frames in the video frames;

determine when a first scene change frame and a second scene change frame occur greater than a first threshold number of frames apart, and when so providing information for the encoder to encoding the first and second scene changes in a normal fashion;

determine that the first scene change frame and the second scene change frame occur less than the first threshold number of frames, and when so performing the following steps:

determine a complexity of a first scene ($X_1$), a second scene ($X_2$) and a third scene ($X_3$), wherein the $X_1$, $X_2$ and $X_3$ are separated by the first and the second scene change frames; and determine when an absolute difference between the complexity of $X_1$ and $X_2$ is greater than a first complexity threshold Xth1 and the absolute difference of the complexity of $X_2$ and $X_3$ is less than a second complexity threshold Xth2, and when so encoding the first scene change frame as a scene change I frame, but picking a quantization parameter (QP) based on a complexity that is blended from the complexity of $X_2$ and $X_3$.

7. The apparatus of claim 6, wherein the memory stores code to enable the statistical analysis processor to perform the further step of:

determining when an absolute difference between the complexity of $X_1$ and $X_2$ is greater than the first complexity threshold Xth1 and the absolute difference of the complexity of $X_2$ and $X_3$ is greater than the second complexity threshold Xth1, and when so encoding the first scene change frame and the second scene change frame as a scene change I frame.

8. The apparatus of claim 7, wherein the memory stores code to enable the statistical analysis processor to perform the further step of:

determining when an absolute difference between the complexity of $X_1$ and $X_2$ is less than the second complexity threshold Xth2 and the absolute difference of the complexity of $X_2$ and $X_3$ is less than the second complexity threshold Xth2, and when so ignoring the first scene change frame and encoding the second scene change frame as a scene change I frame.

\* \* \* \* \*